(12) United States Patent
Oshiro et al.

(10) Patent No.: US 6,254,701 B1
(45) Date of Patent: Jul. 3, 2001

(54) COPPER ALLOY AND SLIDING BEARING HAVING IMPROVED SEIZURE RESISTANCE

(75) Inventors: Haruyuki Oshiro; Takashi Tomikawa; Soji Kamiya; Katuyuki Hashizume, all of Aichi (JP)

(73) Assignee: Taiho Kogyo Co., Ltd., Aichi (JP)

( * ) Notice: Subject to any disclaimer, the term of this patent is extended or adjusted under 35 U.S.C. 154(b) by 0 days.

(21) Appl. No.: 08/818,066

(22) Filed: Mar. 14, 1997

(30) Foreign Application Priority Data

Mar. 14, 1996 (JP) .................................................... 8-057874
Jun. 10, 1996 (JP) .................................................... 8-147092

(51) Int. Cl.[7] .............................. C22C 9/00; F16C 17/00
(52) U.S. Cl. .......................... 148/432; 148/281; 148/282; 148/431; 148/433
(58) Field of Search .................................... 420/470, 472, 420/473, 476, 477, 481, 482, 485, 487; 148/431, 432, 433, 434, 435, 281, 282

(56) References Cited

FOREIGN PATENT DOCUMENTS

| 2 312 679 | 11/1997 | (DE) . |
| 0 411 882 | 2/1991 | (EP) . |
| 2 593 114 | 7/1987 | (FR) . |

*Primary Examiner*—Sikyin Ip
(74) *Attorney, Agent, or Firm*—Armstrong, Westerman, Hattori, McLeland & Naugton, LLP (57) ABSTRACT

A sliding bearing having improved seizure resistance has the following structure.

(a) A bearing layer (2). It comprises a copper alloy containing in a Cu matrix Ag, Sn, Sb, In, Mn, Fe, Bi, Zn, Ni and/or Cr.

(b) A fisrst sub-layer (3) of the bearing layer (2). It (3) contains concentrated element, hexagonal compound or eutectic of said element(s).

(c) A second sub-layer (2a) in which said element in essential solid-solution state.

(d) Metal backing (1).

14 Claims, 8 Drawing Sheets

COPPER ALLOY AND SLIDING BEARING HAVING IMPROVED SEIZURE RESISTANCE

BACKGROUND OF INVENTION

1. Field of Invention

The present invention relates to copper-alloy and bearing having improved seizure resistance. More particularly, the present invention relates to a copper alloy having improved seizure resistance over that of a conventional KELMET, i.e., a Cu—Pb—Sn alloy, as well as a bearing, in which the improved copper-alloy is used.

2. Description of Related Art

KELMET, which is a representative conventional copper-based sliding material, is usually coated with a 10- to 20 $\mu$m-thick overlay consisting of soft metal or resin and is used as engine parts. In the initial period of use of the sliding bearing, the overlay wears out in such a manner that its surface conforms to that of the opposed shaft, with the result that seizure between the shaft and the sliding bearing becomes difficult to occur. One of the functions of the overlay resides, therefore, in ensuring the compatibility between the shaft and the sliding bearing.

Furthermore, it is usually carried out to form a Ni plating as the underlying layer of the overlay. The Ni plating and the KELMET are referred to as the Ni barrier and the lining, respectively. When the overlay is totally worn out to expose the underlying Ni barrier or even the lining, the seizure becomes readily to occur. In the conventional bearings, the overlay has, therefore, been deposited more thickly than the level required for the compatibility.

Lead particles contained in the KELMET are elongated by the opposed shaft and form a soft film on the sliding surface. The lead particles exhibit, therefore, a function to prevent seizure. This function alone is, however, inadequate under the recent sliding condition which becomes more and more severe. Therefore, proposals have been made to enhance the seizure resistance of the conventional KELMET. They are: adding a Cu-matrix enhancing element such as P, Al or the like; adding Bi which has good compatibility; adding a seizure-enhancing component such as graphite; and adding a wear-resistance enhancing component such as $Al_2O_3$; and, impregnating the sintered material with resin. These proposals have attained some degree of success.

Engine oil, transmission oil, gear oil or the like are the lubricating oil which lubricates between the above-mentioned sliding materials and the opposite material. The sulfur-based additives are added to these oils.

First, the additives to the gasoline-engine oil are dialkylmonosulfide for preventing the oxidative deterioration of the engine oil, a sulfonate- or phenate- base metal detergent agent for cleaning the sludge formed by oxidation of the engine oil, a dithiophosphate molybdenum compound or a dithiocarbamate molybdenum compound for preventing foaming of the low-viscosity engine-oil, or the like. The above-mentioned dialkylmonosulfide is believed to tonically decompose the hydroperoxide which is formed by the oxidation of the base oil. However, detrimental effects of the additives are also pointed out. For example, the metal-based detergent agent forms sulfate-ash or sludge. The amount of its use is, therefore, limited. In addition, it is said that the foaming-preventing agent may exert a detrimental effect on the performance of the bearing metal.

ZnDTP (dialkyldithiozincphosphate) is added to the diesel-engine oil as a countermeasure against the wear due to soot. Into the rotary-engine oil, olefin sulfide, sulfurized oil or the like is added as the sulfur-based extreme pressure agent, and thiozinc-phosphate, dithiocarbamate molybdenum sulfide is added as the organic-metal anti-wear agent.

Into the transmission oil and the gear oil, olefin sulfide, sulfurized oil or the like is added as the sulfur-based extreme pressure agent, and thiozinc-phosphate or dithiocarbamate molybdenum sulfide is added as the organic-metal anti-wear agent, phosphate-esteramino-salt as the phosphorus-base anti-wear agent. The sulfur concentration ranges from 0.37 to 1.7% in the commercially available oil at present.

It is known that, when the above-mentioned various oils detriorate, corrosion problems arise in the copper-based sliding materials. As a corrosion countermeasure, the present applicant filed the following patent applications.

U.S. Pat. No. 4,878,768: The deteriorated oil causes the corrosion of the Pb phase present in the clearances between the skeleton of the Cu—Pb based sintered alloy used as a sliding bearing of a diesel engine. In order to prevent such corrosion, In is added to the Pb phase.

Japanese Unexamined Patent Publication No. 7-118,777: sintered copper-alloy-based composite sliding member, which is based on the sintered copper alloy consisting of more than 15% and up to 40% of Zn, from 0.5 to 6% of graphite, and from 0.5 to 6% of one or more of $Al_2O_3$, $SiO_2$ and $Fe_3P$, and the balance being Cu. In this application, Zn is added in the above-mentioned amount to prevent the corrosion which results from the fact that the deteriorated transmission oil forms CuS on the surface of the copper alloy.

When the conventional KELMET is used as the lining, lead contained in the KELMET is corroded by the deteriorated lubricating oil, and the surface of lining is likely to be roughened. Furthermore, lead is dissolved into the lubricating oil, and the lead phases of the KELMET are changed into pores, thereby lessening the strength of the KELMET and thus causing the lining to collapse. The seizure resistance of the conventional KELMET is, therefore, very low.

The present inventors carried out a sliding test of a copper-based sliding material, in which the lubricating oil with the above-mentioned sulfur-based additives was used, and which almost wholly reproduces the usage conditions of an actual machine. It was then recognized that the total acid value of the lubricating oil (diesel-engine oil, CD grade, 10W-30) greately increased as follows.

|  | Time 0(h) | 50(h) | 100(h) | 150(h) | 220(h) |
| --- | --- | --- | --- | --- | --- |
| Total acid number (mg KOH/g) | 1.3 | 6.4 | 18.0 | 21.5 | 22.3 |
| Strong acid number (mg KOH/g) | 0 | 0 | 0.1 | 0.2 | 0.3 |
| Total base number (mg KOH/g) | 3.8 | 0.5 | 0 | 0 | 0 |

The corrosion progresses along with the increase in the acid value. In the conventional bearing, the thickness of the overlay deposited on the lining cannot, therefore, be as thin as the value satisfying the compatibility.

The Ni barrier, which has been heretofore used as the underlying layer of the overlay, impedes the diffusion of Sn and In from the overlay into the Pb phases of the lining and has thus a role of maintaining the corrosion resistance of the KELMET at a high level. On the other hand, when the Ni barrier is exposed, the seizure is disadvantageously likely to occur because of poor seizure resistance of Ni.

According to a recently published research ("Tribologist" (in Japanese) Vol. 41, No. 2, 1996, pp 115–120), the surface of metallic material is converted to an amorphous structure due to repeated sliding friction, and the wear resistance of the surface of various metallic materials can be enhanced by utilizing the vitrification phenomena. It is anticipated that the material development from such a point of view will be accelerated. The present inventors have started already extensive studies to enhance the sliding properties of the copper-alloy surface by means of adding particular element (s) and modifying the surface of lining.

SUMMARY OF INVENTION

It is, therefore, an object of the present invention to provide a copper alloy having improved seizure resistance.

It is another object of the present invention to provide a sliding bearing, which comprises a copper alloy and which exhibits improved seizure resistance.

It is a further object of the present invention to improve seizure resistance of a sliding bearing, which comprises a copper-alloy lining, an overlay, and a thin overlay.

It is a further object of the present invention to maintain corrosion resistance of a sliding bearing, which comprises a copper-alloy lining but not the Ni barrier.

The present inventors discovered that, when the particular element(s) is concentrated or a hexagonal compound or eutectic of the particular element(s) is formed in the outermost surface layer of the copper alloy layer, the objects of the present invention are attained.

In accordance with an object of the present invention there is provided a copper alloy having improved seizure resistance, characterized in that the alloy contains in a Cu matrix at least one element selected from the group consisting of Ag, Sn, Sb, In, Mn, Fe, Bi, Zn, Ni and Cr which are essentially in a solid solution state.

There is also provided a bearing comprising:

a bearing layer, which comprises a copper alloy containing in its matrix at least one element selected from the group consisting of Ag, Sn, Sb, In, Mn, Fe, Bi, Zn, Ni and Cr which are essentially in a solid solution state; and, a backing metal on which the bearing layer is bonded.

There is further provided a solid-type bearing comprising:

a bearing layer, which comprises a copper alloy containing at least one element selected from the group consisting of Ag, Sn, Sb, In, Mn, Fe, Bi, Zn, Ni and Cr which are essentially in a solid solution state, which bearing layer is not bonded on the metal backing.

There is further provided a sliding bearing comprising:

a bearing layer, which comprises a copper-alloy containing at least one element selected from the group consisting of Ag, Sn, Sb, In, Mn, Fe, Bi, Zn, Ni and Cr; and, a first sub-layer to said bearing layer, in which sub-layer said at least one element is concentrated; and, a second sub-layer, comprised in the bearing layer, being contiguous to the first sub-layer, extending in direct vicinity to the first sub-layer and containing said at least one element in an essentially solid-solution state.

There is further provided a sliding bearing comprising:

a bearing layer, which comprises a copper-alloy containing at least one element selected from the group consisting of Ag, Sn, Sb, In, Mn, Fe, Bi, Zn, Ni and Cr; and, a first sub-layer to said bearing layer, in which a sub-layer hexagonal compound or eutectic of said at least one element, which may contain Cu, is formed; and, a second sub-layer, comprised in the bearing layer, being contiguous to the first sub-layer, extending in direct vicinity to the first sub-layer and containing said at least one element in an essentially solid-solution state.

There is further provided a sliding bearing comprising:

a bearing layer, which comprises a copper-alloy containing at least one element selected from the group consisting of Ag, Sn, Sb, In, Mn, Fe, Bi, Zn, Ni and Cr;

an overlay, which is locally worn out due to the initial breaking-in of the bearing;

a first sub-layer to said bearing layer and beneath the worn-out portion of the overlay, in which sub-layer said at least one element selected from the group consisting of Ag, Sn, Sb, In, Mn, Fe, Bi, Zn, Ni and Cr; and at least one element selected from the group consisting of O and S are concentrated; and, a second sub-layer, comprised in the bearing layer, being contiguous to the first sub-layer, extending in direct vicinity to the first sub-layer and containing said at least one element in an essentially solid-solution state.

There is also provided a sliding bearing, comprising a bearing layer, which comprises a copper-alloy containing at least one element selected from the group consisting of Ag, Sn, Sb, In, Mn, Fe, Bi, Zn, Ni and Cr;

an overlay, which is locally worn out due to the initial breaking-in of the bearing;

a first sub-layer to said bearing layer and beneath the worn-out portion of the overlay, in which sub-layer a hexagonal compound or an eutectic of said at least one element selected from the group consisting of Ag, Sn, Sb, In, Mn, Fe, Bi, Zn, Ni and Cr; is formed, and at least one element selected from O and S is concentrated; and, a second sub-layer, comprised in the copper-alloy layer, being contiguous to the first sub-layer, extending in direct vicinity to the first sub-layer and containing said at least one element in an essentially solid-solution state.

The essential solid-solution means that a minor or secondary phase, which consists of or comprises at least one element selected from the group consisting of Ag, Sn, Sb, In, Mn, Fe, Bi, Zn, Ni and Cr, is essentially not formed.

The particular solute element(s) of the Cu matrix moves, during sliding, to the lining surface under generated friction heat, while structural change of the lining surface occurs. A local layer, in which said at least one element(s) is concentrated, is then formed. It further reacts with the sulfur-based additives in the lubricating oil and forms a sulfur-based compound. In addition, it further reacts with oxygen in the lubricating oil and forms an oxygen-based compound. The concentrated layer, the sulfur compound and the hexagonal compound have excellent solid-lubricating effect, excellent sliding property even under high surface pressure and good corrosion resistance.

The present invention is hereinafter described with reference to the drawings.

DESCRIPTION OF PREFERRED EMBODIMENTS

The results of basic experiments for investigating the seizure resistance of the concentrated layer are herein-after described.

A metal or alloy sheet, the composition of which is shown in Table 1, was heat treated to form a hexagonal compound shown in the equilibrium phase-diagram, except that No. 3 having eutectic composition was not heat treated. The sheet was then worked in the form of a specimen (1 cm$^2$ of the surface area, 1.0–1.5 $\mu$m Rz) and wash The specimens were subjected to the seizure test under the following conditions.

Figure 2:
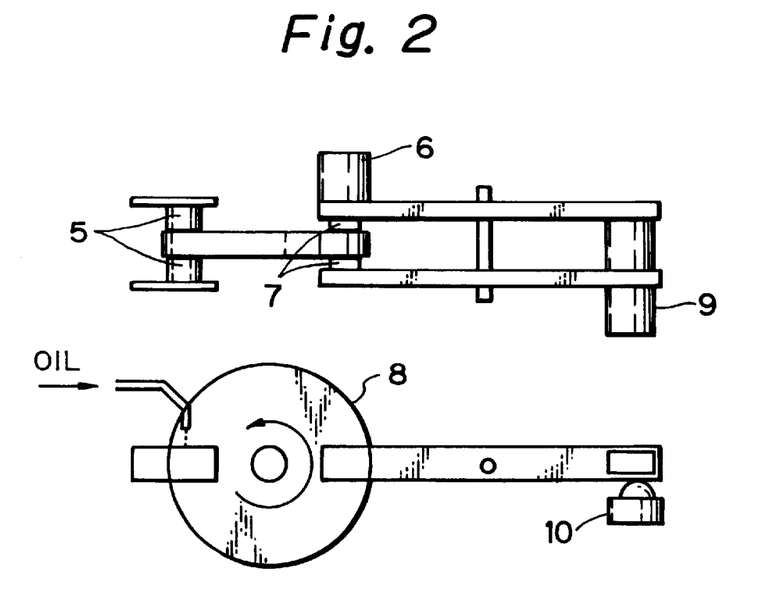
FIG. 2 is a drawing of a pin-on disc type tester.

A tester: As shown in FIG. 2.

Sliding Speed: 15m/s

Load: Gradual increase of load (step mode), 500N/10 minutes

Kind of oil: 10w-30, CD Grade

Temperature of oil: Room temperature

Opposed material:
  hardened S55G (Hv 550–650),
  roughness-0.5–0.8 $\mu$m Rz

In FIG. 2: 5—oil-feeding pad; 6—hydraulic cylinder; 7—a test piece: 8—disc: 9—balance weight; and 10—a load cell.

The results are shown in Table 1.

TABLE 1

| | Composition (wt %) | | | Seizure Load | Material |
|---|---|---|---|---|---|
| No. | Cu | Au | Sn | Others | (kg/mm$^2$) | Structure |
| 1 | — | 72 | 28 | — | 860 | h - Ag$_3$Sn($\epsilon$) |
| 2 | — | 85 | 15 | — | 840 | h - Ag—Sn($\zeta$) |
| 3 | — | 3 | 97 | — | 900 | Ag—Sn eutectic |
| 4 | — | 25 | — | Cd = 75 | 800 | h - Ag—Cd ($\epsilon$) |
| 5 | — | 73 | — | In = 27 | 880 | h - Ag$_3$In ($\zeta'$) |
| 6 | — | 60 | — | Mg = 40 | 800 | h - Mg$_3$Ag ($\epsilon$) |
| 7 | — | 73 | — | Sb = 27 | 820 | h - Ag$_3$Sb ($\epsilon$) |
| 8 | — | 85 | — | Sb = 15 | 840 | h - Ag—Sb ($\zeta$) |
| 9 | — | 87 | — | Al = 13 | 900 | h - Ag—Al ($\zeta$) |
| 10 | 1 | — | 99 | — | 760 | h - Cu—Sn eutectic |
| 11 | 15 | — | — | Cd = 85 | 800 | h - Cd$_3$Cu ($\epsilon$) |
| 12 | 52 | — | — | Cd = 48 | 780 | h - CdCu$_2$ |
| 13 | 67 | — | — | Sb = 33 | 800 | h - Cu$_{4.5}$Sb ($\epsilon$) |
| 14 | — | — | 95 | Cd = 5 | 820 | h - Cd—Sn ($\beta$) |
| 15 | — | — | 79 | In = 21 | 880 | h - InSn$_4$ ($\gamma$) |
| 16 | 62 | — | 38 | — | 830 | Cu$_3$Sn |
| 17 | — | — | 78 | O = 22 | 620 | Sn oxide |
| 18 | 100 | — | — | — | 400 | Pure Cu |
| 19 | — | 100 | — | — | 450 | Pure Ag |
| 20 | — | — | 100 | — | 420 | Pure Sn |
| 21 | — | — | — | In = 100 | 420 | Pure In |

"h" in the table means hexagonal.

As is apparent from Table 1, the compounds or eutectic of Ag, Sn, Sb, In, Al, Mg and Cd has seizure resistance approximately 1.5 times or more as high as the pure metal such as Cu, Ag or Sn. In No. 3 (eutectic), pure metals of Ag and Sn are finely mixed and the seizure resistance is high. This is due to the synergistic effect of the coexisting different metals. Enhancement of seizure resistance due to the hexagonal compound is believed to be due to the synergistic effect and cleavage, as in the case of the following materials. Namely, MoS$_2$, graphite and h-BN have hexagonal closest packing (hcp) structure and cleavage property. The enhancement of seizure resistance due to these materials is attributable to the above structure and property.

Materials including No. 1 (h-Ag$_3$Sn), No. 3 (Ag—Sn eutectic), and No. 10 (Cu—Sn eutectic) of Table 1 were subjected to the other basic test for measuring the coefficient of friction and adhesion. These materials are shown in Table 2 as Material Nos. 22, 23 and 25, respectively. The test was carried out under the following conditions.

A tester: A Bouden/Teber stick-slip tester shown in FIG. 3

Sliding Speed: 0.06 m/s

Load: 5N

Lubricating Condition: application of oil

Opposed Material: SUJ 2 (8mm in diameter)

Figure 3:
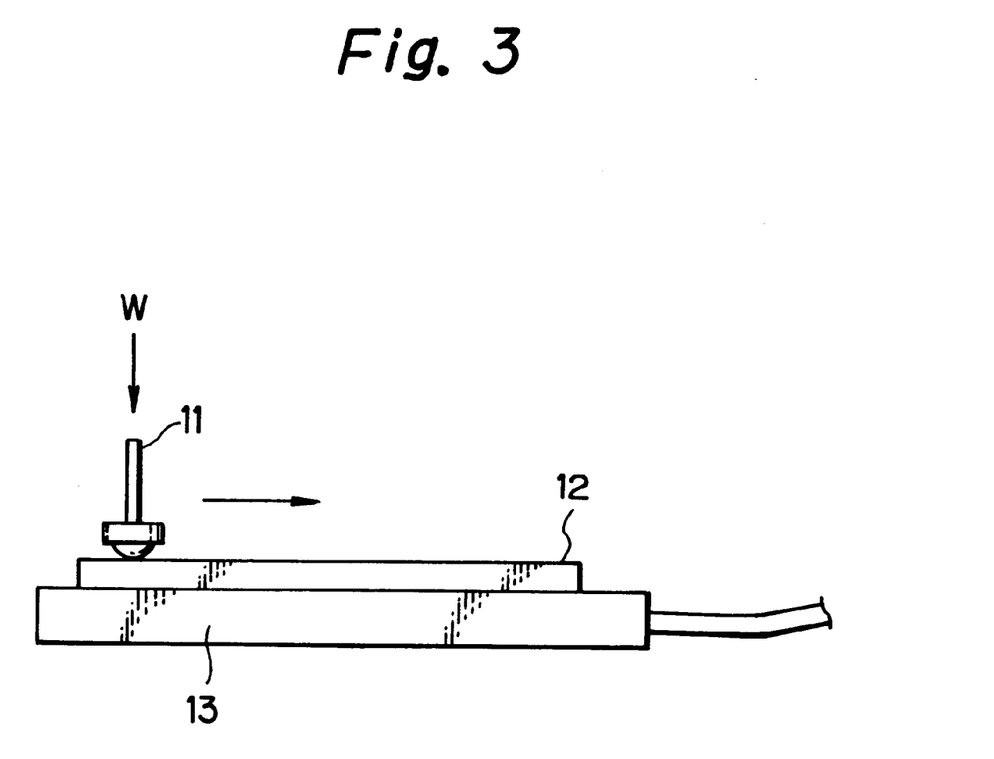
FIG. 3 is a drawing of a Bouden/Teber type stick slip tester.

In FIG. 3: 11—pin; 12—specimen: and 13—heater

The results are shown in Table 2.

TABLE 2

| | | | | | Stick Slip | | |
| No. | Cu | Ag | Sn | Others | Generation Temperature (° C.) | Coefficient of Friction at Generation | Adhesion Area ($\mu$m) |
|---|---|---|---|---|---|---|---|
| 22 | — | 72 | 28 | — | 170 | 0.45 | 300 |
| 23 | — | 3 | 97 | — | 165 | 0.48 | 600 |
| 24 | 62 | — | 38 | — | 160 | 0.49 | 500 |
| 25 | 1 | — | 99 | — | 160 | 0.50 | 700 |
| 26 | — | — | 78 | O = 22 | none | — | 0 |
| 27 | 100 | — | — | — | 100 | 0.40 | 2000 |
| 28 | — | 100 | — | — | 180 | 0.50 | 500 |
| 29 | — | — | 100 | — | 160 | 0.50 | 1100 |

From Table 2, it is clear that No. 26 having a composition esponding to tin oxide is most resistant to adhesion. No. i.e., h-Ag$_3$Sn, has the resistance to adhesion following 26. No. 28 (pure Ag), and Nos. 24, 25 (Cu—Sn) have somewhat resistance to adhesion. The resistance to adhesion of No. pure Cu) is the lowest.

The present inventors conceived, based on the results of the basic experiments, an idea that the seizure resistance of the lining can be enhanced by means of forming on the surface of a lining the hexagonal compound(s) or eutectic or highly concentrating Ag, Sn or the like to such a level forming a compound.

The present inventors further advanced the research and discovered that it is important to once solid-dissolve the Ag, Sn or the like in the lining before use, that is, these additive elements should not form the secondary phase before use. More specifically, no secondary phase should be identified, under the X-ray diffraction condition described hereinbelow, in the alloy's surface portion participating in the sliding. When the secondary phase is formed, no matter whether the solute element(s) of the copper-alloy matrix is in an equilibrium state or non-equilibrium state, the additive element (s) will not be essentially concentrated in the lining surface after sliding.

The common properties of the above additive elements (1) are liable to form sulfide, (2) are liable to be alloyed to copper and do not considerably harden copper, (3) are highly resistant to deteriorated lubricating oil, (4) are liable to be concentrated on the lining surface, (5) form a concentrate having a low coefficient of friction, have improved wear resistance and non-adhesive property, or form a hexagonal compound or eutectic, (6) are easily soluble in the Cu matrix, and (7) are difficult to precipitate.

The other elements than the above-mentioned ones, for example Ca and Na, fulfill (1) but do not fulfill (2). Pb is not favorable in the light of (3). Ti and V are difficult to form sulfide as compared with Cu, and therefore do not fulfill (1). V and W having a large mass is difficult to move in the copper alloy and therefore does not satisfy (4).

Phase segregation of Pb and Bi occurs due to the difference in melting point between them and Cu. The so separated phases are difficult to homogneize. Pb and Bi therefore does not fulfill (6). Mg fulfills (1) but does not fulfill (5).

The essential solid solution state of the additive element (s) according to the present invention is maintained in the copper alloy during a certain period of use of the bearing. When the friction proceeds, the solid contact between the shaft. When the friction progresses, solid contact between the shaft and the lining occurs frequently. When such a condition is realized, the additive element(s) concentrate on the sliding surface of the lining and then react with sulfur, oxygen and the like. Since an element, which is liable to precipitate, easily forms a secondary phase, the amount of the solute element as a source of the concentrated layer becomes disadvantageously small. The condition (7) mentioned above is, therefore, important, and the known precipitation-type alloys are excluded from the present invention. As is well known, when Ni and Si are co-present, they precipitate. In this regard, since Si is one of the impurities, Ni is not a precipitating element in the present invention.

The hexagonal compound mentioned in (5) above is, particularly that of Ag, Sn, Cd, In, Mg, Sb and Al, and is, for example, an Ag—Sn compound (ζ-zeta) with the weight ratio of Ag : Sn of 85 to 15, or its vicinity. The hexagonal compound is formed on the surface layer of the lining, provided that Ag and Sn concentrations in the bearing surface exceed those of solubility in Cu, and further, energy is imparted to the surface layer of lining, in which Ag and Sn are in the inventive essential solid solution state. When these conditions are fulfilled, Ag and Sn are first concentrated and then the hexagonal compound is formed in the surface layer. The hexagonal compound enhances the seizure resistance more than the concentrated layer does. The energy, mentioned above is the bearing temperature under normal condition of use of the bearing, for example 120° C. or more in terms of the oil temperature. The equivalent condition to the above-described one may be realized before use of a bearing, such that it is heat treated at a temperature of oil and subjected to pressure, which is equivalent to that from a shaft, or further it is subjected to temperature gradient equivalete to that during use of a bearing.

The eutectic mentioned in item (5) has fundamentally the same effects as the hexagonal compound. For example, Ag—Sn has an eutectic of point at 3.5% by weight of Ag, 96.5% of Sn. When the Ag and Sn are once (super-saturation) dissolved in the Cu—Ag—Sn alloy and then concentrate on the surface layer of a bearing, Ag, Sn and $Ag_3Sn$ disperse finely and thinly on such layer, as a result that the seizure resistance is enhanced as compared with that of concentration of a single element.

The above-mentioned additive elements according to the present invention fulfills all of (1) through (7). Particularly, Ag fulfills (2)–(5) to a high degree. The properties as a whole of Sn is not comparable to those of Ag, while the property (5) of Sn is excellent. It is, therefore, preferable in the present invention that Ag as an essential additive element and the other element(s), particularly Sn, are added together.

In order to thoroughly concentrate the additive element(s) on the sliding surface, the total amount of the additive element(s) is preferably 0.1% by weight or more.

The highest amount of the additive element(s) is not numerically limited, provided that it is essentially dissolved in the Cu matrix. However, the following ranges are preferable for concentrating the additive element(s). Ag: 0.1 to 2% by o weight. Sn: 1 to 10% by weight. Cd: 0.1 to 5% by weight. Mn: 0.1 to 5% by weight. Fe: 0.01 to 10% by weight. Bi: 1 to 30% by weight. Zn: 1 to 30% by weight. Ni, 5 to 50% by weight. Cr: 1 to 5% by weight. The following ranges are more preferable. Ag: 0.3 to 1.0% by weight. Sn: 1 to 7% by weight. Cd: 0.3 to 3% by weight. Ni: 0.1 to 5% by weight. Fe: 0.01 to 5% by weight. Bi: 1 to 20% by weight. Zn: 1 to 30% by weight. Ni, 5 to 50% by weight. Zn: 15 to 20% by weight. Cr: 1 to 3% by weight.

The amount of additive element(s) is preferably within the following ranges for forming the hexagonal compound or eutectic. Ag, Sn: from 1 to 10% by weight. Cd, In, Mg, Sb, Al:from 1 to 15% by weight (in the case of two or more elements, the sum of each content).

Except for the elements, such as Ni and V, which form a complete solid solution with Cu, the essential solid solution state of the additive element(s) is preferably a non-equilibrium state in the light of forming a concentrated layer, probably because energy, which forces the additive element (s) to precipitate out of the solid solution, would promote concentration. The concentration phenomena discovered by the present invention cannot, however, be completely elucidated only by the general precipitation phenomenon.

The equilibrium solid-solution amount of the above mentioned elements in a binary Cu alloy is determined by phase diagram (M. Hansen, Constitution of Binary Alloys, McgrawHill Book Company, New York, 1964). For example, 0.1% by weight for Ag, 1.3% by weight for Sn, 0.5% by weight for Cd, and 0.05% by weight for Cr at approximately 200° C. In a ternary alloy, a practical determination of the equilibrium solid-solution amount can be performed such that, when any one of the additive elements exceeds the equilibrium solubility of a binary alloy, the solute elements are in a non-equilibrium state.

The copper alloy, which contains the additive element(s) in a non-equilibrium state, is produced preferably by the casting method or atomizing method. In the casting method, the melt is cooled at a cooling speed of 100° C./minute or higher, which forces the additive element(s) to dissolve in the Cu matrix. The production steps subsequent to the casting may be employed in such a manner that the dissolved element(s) are retained in the solid solution. However, since such steps must be carried out very carefully, the cast alloy, such as a continuously cast strip, is preferably used as a lining as it is. In the case of the sintering method, the atomized powder, which is produced by high-speed cooling of the copper-alloy melt, is subjected to the sintering process at a solutionizing temperature of the additive element(s), followed by rapid cooling at a cooling speed of 50° C/minute or more.

In addition to the above additive element(s), from 0.01 to 0.5% of P can be added as a de-oxidizing agent or a sinter-promoting agent.

The balance of the above composition is impurities ordinarily contained in the copper, such as Si, O and the like. The purity of copper may be such as that of tough-pitch copper, electric copper, electrolytically refined copper, and OFHC (Oxygen Free High Conductivity Copper). S, which is permissible as an impurity in the copper alloy, is insoluble in Cu and is, therefore, present as the Cu—S secondary phase. Sulfur does not impede the sulfur-based compound of the additive element(s), provided that the sulfur content is of an impurity level.

When the copper-based sliding material according to the present invention is rendered in the form of sintered material, the sintering pores are preferably impregnated with resins. The impregnating resin which can be used is almost all resins used as the sliding material, preferably PI (polyimide), PAI (polyamide imide), PEI (polyetherimide), PEEK (polyetherketone), aromatic PA (polyamide), phenol resin, epoxy resin, PTFE (polytetrafluoroethylene), and fluorine resin (PFA (copolymer of tetrafluoroethylene perfluoroalkylvinylether), ETFE (copolymer of tetrafluoroethylene-ethylene), and FEP (copolymer of tetrafluoroethylene-hexafluoropropylene)). The amount of resin is preferably from 30 to 80% by weight, more preferably from 40 to 60% by weight. Porosity of the sintered material is preferably from 70 to 20%, preferably from 60 to 40%.

A solid lubricant, wear-resistant additive or the like can be mixed in the impregnating resin. Specifically, the solid lubricant, is such as graphite, PTFE, Pb, Pb—Sn alloy, carbon fluoride, and lead fluoride. The wear-resistant additives are $Al_2O_3$, $SiO_2$, $Si_3N_4$, clay, talc, $TiO_2$, mulite, calcium carbide, Zn, AlN, $Fe_3P$, $Fe_2B$, $Ni_2B$, FeB. In addition, inorganic fiber, such as glass fiber, carbon fiber, potassium titanate fiber and the like can be used. Organic fiber, such as aromatic PA fiber, whisker such as SiC whisker, and metal fiber such as Cu fiber, stainless steel fiber and the like can also be used.

The copper alloy according to the present invention, which is in the form of a rolled material or sintered material, may be bonded on the metal backing to provide a sliding bearing. The copper alloy can also be in the form of a solid bearing not bonded on the metal backing.

The overlay is not deposited on the copper alloy according to the present invention, in the form of a bush. The overlay D is deposited on the copper alloy according to the present invention, when it is used as various sliding bearings of an internal combustion engine, such as a connecting rod bearing.

The overlay, which undergoes the sliding in the lubricating oil at a high temperature, locally wears out due to the initial breaking in, or even the copper alloy of the lining is no longer covered by the overlay. Along with such wear of the overlay, the lining gradually wears out. The additive element(s) then moves gradually toward the vicinity of lining surface and locally form a film or layer, in which the additive element(s) is concentrated.

When the surface of the lining is observed after sliding by SIMS (Secondary Ion Mass Spectroscopy) method to analyze the additive element(s), concentrated regions of them are detected. The concentration of the additive element(s) in the concentrated regions is, for example, 1.3 times as high as that in the alloy bulk. The detection of the concentrated layer by an analysis is therefore easy because of high concentration. The concentrated layer is of approximately 1 $\mu$m thickness and very thin.

When the sliding further advances, the concentrated layer reacts with sulfur in the lubricating oil, with the result that a concentrated layer of the additive element(s) and sulfur is formed.

The base oil of the lubricating oil, to which the present invention can be applied, is not limitative at all but contains sulfur-based additive(s). The sulfur-based additives are such compounds as (poly)sulfide, sulfonate, sulfinate, sulfenate, the phenate give below, (di)thiophsphate compound, thioketone, thioacetal, thiocarbonic acid and its derivative (s), sulfoxide and its derivative(s), sulfonyl, sulfinyl, sulfenyl, and ZnDTP.

Each of these organic-acid compounds decomposes at 100–160° C., which is the sliding temperature, into the corrosive sulfuric acid or its equivalent matter, and forms the Ag—S concentrated layer due to reaction of this acid and the surface of the copper alloy.

The sliding bearing with a metal backing according to the present invention is described with reference to FIG. 1.

Figure 1:
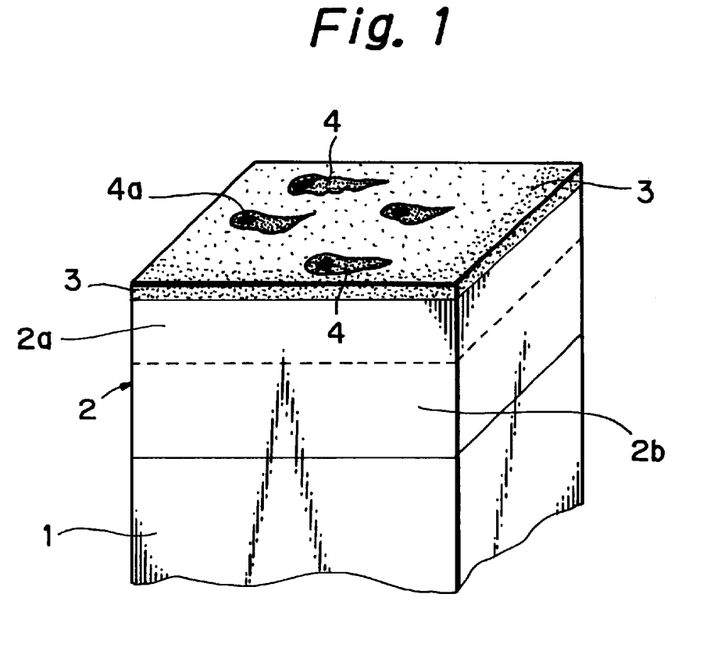
FIG. 1 is a schematic drawing showing the structure of a sliding bearing according to the present invention.

In FIG. 1, the metal backing comprising or consisting of for example a mild- or alloy-steel sheet is denoted by 1. The steel sheet may be shot-blast treated, pickled or plated. The lining 2 is bonded to the metal backing 1 by means of pressure-bonding, sintering or casting. As a result of complete wearingout of the overlay, the surface of lining 2 is exposed. Hereinafter, the description of the concentrated layer, hexagonal compound and eutectic is made with regard to an embodiment of the present invention, in which the bearing layer consists of the copper alloy. However, it is to be understood that the effects of the hexagonal compound and the like are not limited at all to such embodiment but are realzed in every embodiments of the present invention, in which the bearing layer comprises lo inventive copper alloy.

The first sub-layer 3 to the copper-alloy layer is formed on the surface of lining 2 and is 1 $\mu$m or less thin. Ag, Sn, O and the like are concentrated in the first sub-layer 3. These elements are highly concentrated in the first sub-layer 3 as the highly concentrated layer 4, which is elongated in the sliding direction. In a portion of the highly concentrated layer 4, a sulfur-based compound, hexagonal compound or eutectic 4a (herein after simply referred to as "hexagonal compound 4a") is present. The first sub-layer 3, the highly concentrated layer 4 and the hexagonal compound 4a contribute to enhance the seizure resistance, adhesive seizure resistance, wear resistance and corrosion resistance to a level exceedingly higher than that of the conventional KELMET.

Usually, the entire lining 2 consists of the copper alloy having the inventive characterizing solid-solution structure, Ag, Sn and the like are supplied from the bulk 2a and concentrated in the first sub-layer 3. When the lining wears out further as compared with the condition shown in FIG. 1, Ag, Sn and the like are supplied from a more inner portion of the bulk 2a and form a new sub-layer 3. Excellent sliding properties can, therefore, be maintained for a long period of time. In order to realize such concentration, the solute element(s) should be present in the interface and vicinity of the sub-layer 3. The vicinity herein is related to the wear amount of lining and the moving distance of Ag, Sn and the like but is from approximately 30 $\mu$m from the surface of the lining before use, provided that the maximum wear amount of the lining is 20 $\mu$m in the automotive bearings. Even if Ag and Sn during sliding and the like partly precipitate in a deep portion 2b deeper than 30 $\mu$m from the lining surface, the performance of the inventive sliding bearing is not impaired.

The overlay according to the present invention must ensure the initial compatibility but need not to be so thickly deposited as to compensate the poor seizure resistance of the lining.

That is, since the seizure resistance of the copper alloy according to the present invention is excellent, and, further, the above-mentioned concentrated layer is formed upon exposure of the lining, a thick overlay is no more necessary. A thin overlay for the sake of initial compatibility is also advantageous in the light of keeping down costs.

The overlay is preferably from 1 to 25 μm thick, more preferably from 2 to 8 μm thick. A metal-based overlay, such as Pb- or Sn-based overlay, or resin-based overlay can be used in the present invention.

Since the concentrated layer is formed after exposure of the copper alloy to the lubricating oil for a long period of time and is highly resistant against corrosion, it is not neccesary to deposit an ovelay. Therefore, even in a case where the overlay contains Sn, it is not necessary to interpose the Ni barrier between the overlay and lining. This is advantageous because seizure due to exposure of the Ni barrier does not occur when the overlay wears off. However, when the machining accuracy of the opposite shaft is low and hence a thick overlay is to be used, a Ni barrier may be formed to prevent the Sn diffusion.

The present invention is hereinafter described with reference to Examples.

EXAMPLE 1

The atomized powder (150 μm or less of the particle diameter, melt-cooling speed –1000° C./sec) of copper alloy having the compositions shown in Table 3 was dispersed on the 1.5 mm thick steel sheet (SPCC) so that the thickness of dispersed powder amounts to 2 mm. Sintering was then carried out at 850° C. for 35 minutes in hydrogen-gas atmosphere. Subsequently, rapid cooling at a speed of 50° C./minute or more was carried out for the inventive examples, while the cooling was carried out at a speed of 8° C./minute for the comparative examples. The rolling (thickness-reduction ratio was 57%) was then carried out. Materials in bimetal form for the bearing were, therefore, produced. The produced sintered layer was 0.3 mm thick.

TABLE 3

| | Composition | | | | Sub-layer Concentrated layer (Intensity Ratio with respect to Bulk-) | | | Seizure Load | |
|---|---|---|---|---|---|---|---|---|---|
| No. | Cu | In | Ag | P | Sn | Ag | O | (kg/cm$^2$) | Remarks |
| 22 | Bal | 1.0 | 0.1 | 0.08 | 1.4 | 1.4 | 2.0 | 900 | inventive |
| 23 | Bal | 2.0 | 2.1 | 0.2 | 1.6 | 3.8 | 2.5 | 950 | inventive |
| 24 | Bal | 10.0 | 0.1 | 0.2 | 1.6 | 3.8 | 2.5 | 930 | inventive |
| 25 | Bal | 9.0 | 1.9 | 0.09 | 3.0 | 3.2 | 4.0 | 960 | inventive |
| 26 | Bal | — | 1.0 | 0.1 | — | 1.0 | 1.0 | 400 | comparative |
| 27 | Bal | 5.0 | — | 0.08 | 1.0 | — | 1.0 | 300 | comparative |
| 28 | Bal | 4.0 | 1.5 | 0.2 | 1.0 | 1.0 | 1.0 | 300 | comparative |

The intensity ratio of the sub-layer (concentrated layer) is the Auger analysis value of the sub-layer relative to the same value of the interior in the sintered layer (bulk).

Figure 4:
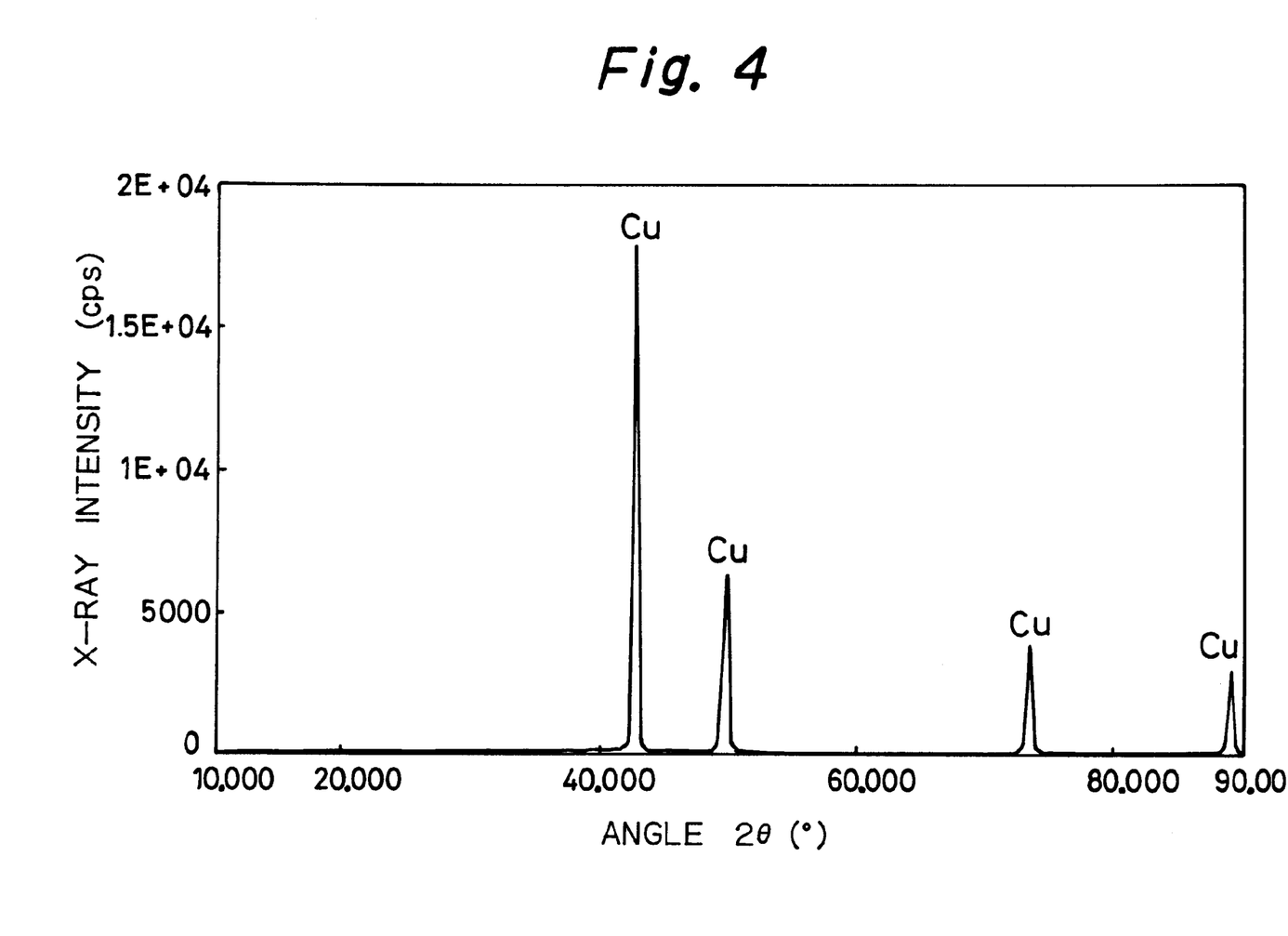
FIG. 4 is an X-ray diffraction chart of Copper Alloy No. 4 in Table 3.
Figure 5:
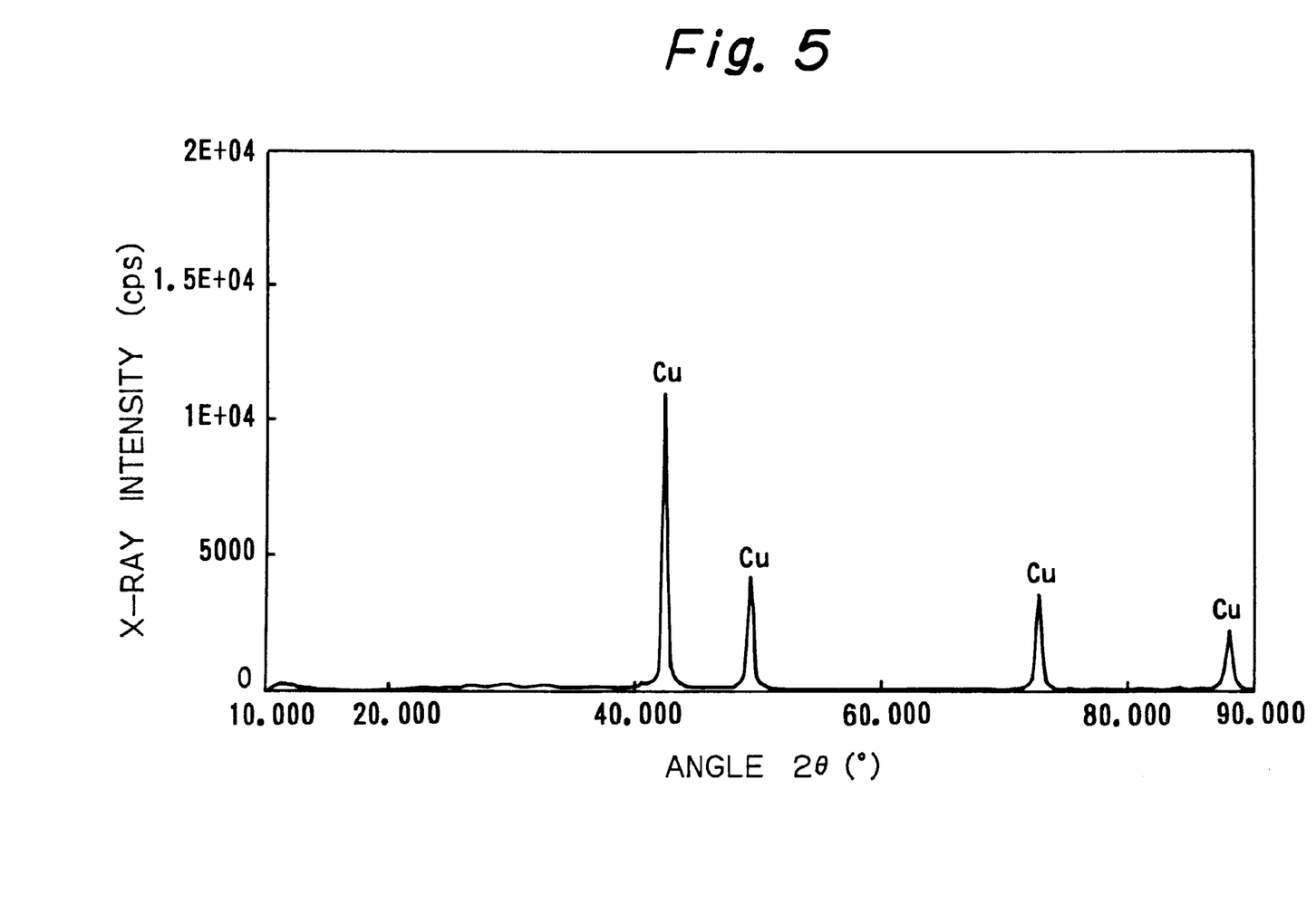
FIG. 5 is an X-ray diffraction chart of Copper Alloy No. 7 in Table 3.
Figure 6:
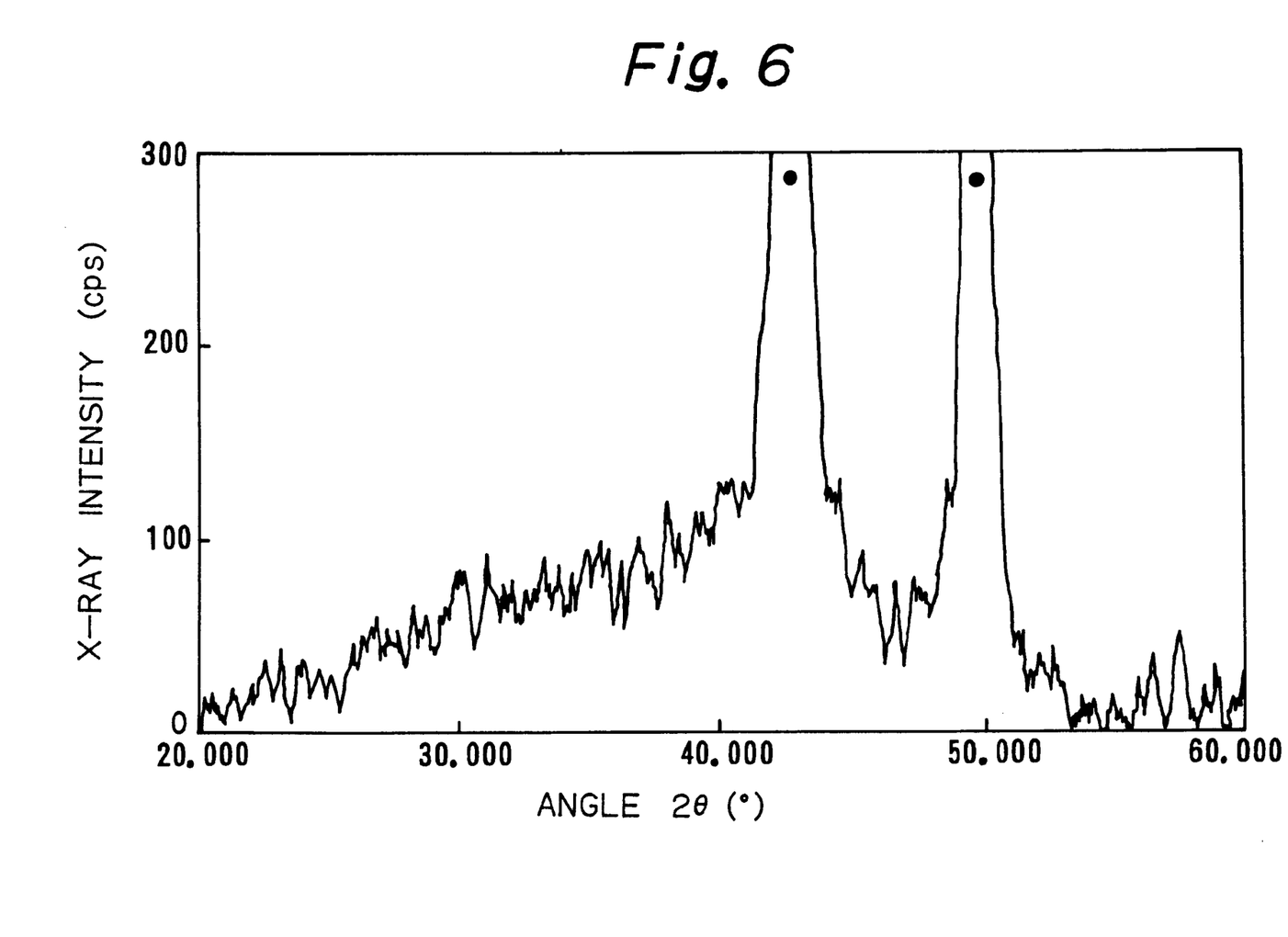
FIG. 6 is a magnified chart of FIG. 5.
Figure 7:
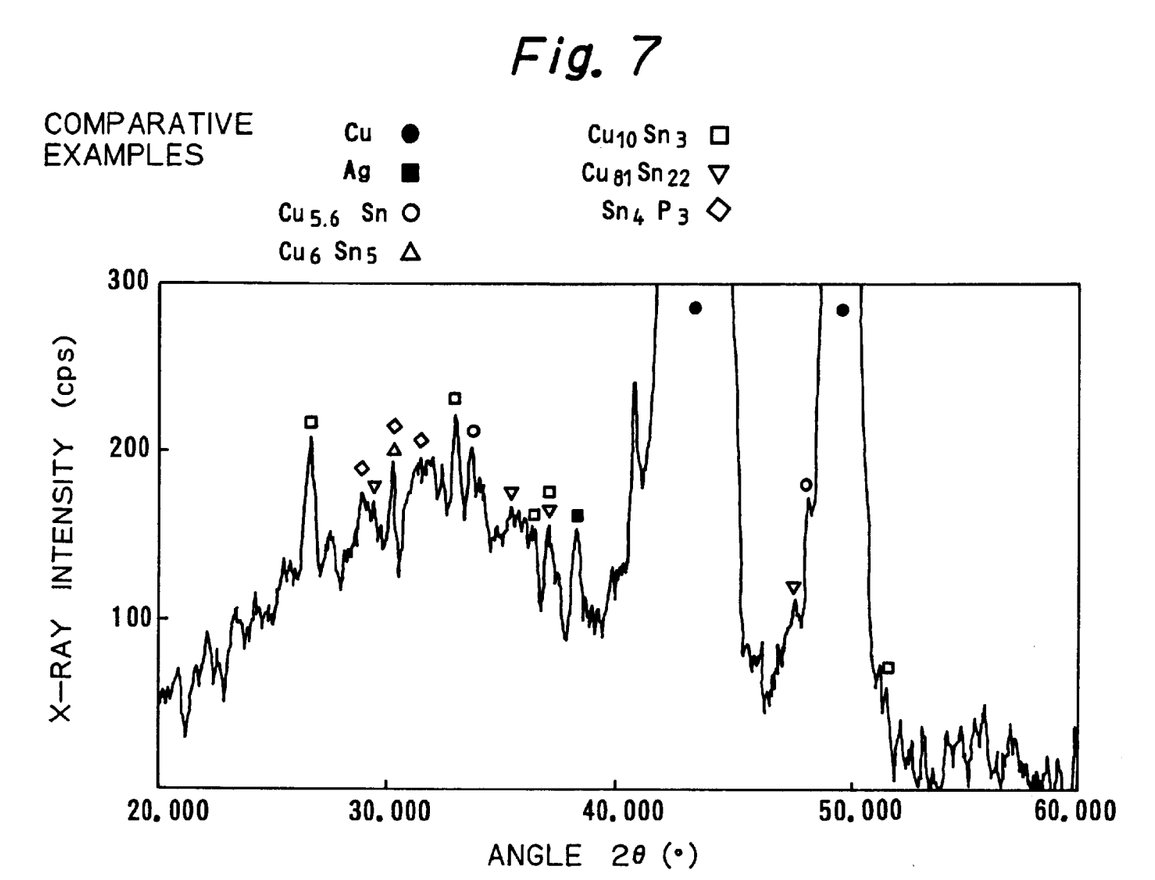
FIG. 7 is a magnified chart of FIG. 6.

Before the seizure test of the inventive sample No. 24 and the comparative sample 28, the X-ray diffraction measurement was carried out under the condition of Cu tube, 300 kV and 150 mA. The respective results are shown in FIG. 4 (enlarged view in FIG. 6) and FIG. 5 (enlarged view in FIG. 7). In the structure of Comparative Sample 28, in addition to the Cu peaks, the peaks of Ag, the Cu solid solution with Ag and Sn as solutes, and the secondary phases, such as Cu—Sn intermetallic compound and Ag, are detected. Contrary to this, in FIGS. 4 and 6 only peaks of Cu are detected.

The bimetal materials were worked into the specimens for the seizure test described with reference to FIG. 2, and subjected to the pin-on disc type seizure test. The seizure load as obtained. The surface of the specimens, which were seized, was measured by the Auger analysis method so as to measure the surface concentration. The results are shown in Table 3.

It is apparent from FIGS. 4 through 7 and Table 3 that the additive elements are concentrated during sliding in the surface layer of the copper alloys having only the solid solution structure, while no such concentration occurs in the copper alloys having the solid solution and the secondary phase structure. The seizure resistance of the latter alloys is therefore low.

EXAMPLE 2

The bimetal materials were produced by the method of Example 1. A Pb—Sn—Cu plating layer is then formed on the lining by using an electroplating fluoride bath. In plating was then formed by the electroplating method, followed by diffusion at 150° C. for 40 minutes. In the preliminary experiment, it was confirmed that Ag and Sn of the inventive alloys shown in Table 4 were retained in the Cu solid solution and were not separated as the secondary phase after the heat treatment at 150° C. for 40 minutes.

The composition of copper alloys, and composition and thickness of the overlays are shown in Table 4.

The bearings having the construction shown in Table 4 were tested in an actual machine under the following conditions.

Engine: L4-2 liter Diesel Engine (equipped with turbo-char ger)

Rotation Number: 4000 rpm

Unit Load of Bearing: 70 MPa

Lubrication Oil: CD10W-30 CD Grade

Inlet Temperature of Oil: 125° C.

Testing Time: 400 hours

It is apparent from Table 4 that the amount of wear of the sliding bearings according to the present invention is small although the overlay is thin. Either seizure occurs or wear amount is considerably large in the comparative bearings.

TABLE 4

| | | Lining Components (wt %) | | | | | Ni | Overlay Components (wt %) | | | | Thickness of Overlay | Wear Amount | Surface State After |
|---|---|---|---|---|---|---|---|---|---|---|---|---|---|---|
| | No. | Cu | Ag | Sn | Pb | P | Plating | Pb | Sn | In | Cu | (μm) | (mg) | 400 h |
| Inventive Examples | 29 | Bal | 0.7 | 6 | — | 0.12 | none | Bal | 10 | 7 | 2 | 5 | 32 | o |
| | 30 | Bal | 0.9 | 4 | — | 0.1 | none | Bal | 10 | 7 | 2 | 3 | 35 | o |
| | 31 | Bal | 1.2 | 5 | — | 0.08 | none | Bal | 10 | 7 | 2 | 7 | 31 | o |
| | 32 | Bal | 1.5 | 3 | — | 0.2 | none | Bal | 10 | 7 | 2 | 5 | 38 | o |
| | 33 | Bal | 0.5 | 7 | — | 0.1 | none | Bal | 10 | 7 | 2 | 4 | 33 | o |

TABLE 4-continued

|  | No. | Lining Components (wt %) | | | | | Ni Plating | Overlay Components (wt %) | | | | Thickness of Overlay (μm) | Wear Amount (mg) | Surface State After 400 h |
|---|---|---|---|---|---|---|---|---|---|---|---|---|---|---|
|  |  | Cu | Ag | Sn | Pb | P |  | Pb | Sn | In | Cu |  |  |  |
|  | 34 | Bal | 1.5 | 6 | — | 0.15 | none | Bal | 10 | 7 | 2 | 6 | 34 | o |
| Comparative Examples | 35 | Bal | — | 5 | 15 | 0.03 | none | Bal | 10 | 7 | 2 | 20 | Seizure at 350 h | X |
|  | 36 | Bal | — | 5 | 25 | 0.04 | none | Bal | 10 | 7 | 2 | 20 | Seizure at 350 h | X |
|  | 37 | Bal | — | 5 | 15 | 0.03 | present | Bal | 10 | 7 | 2 | 20 | 105 | X |
|  | 38 | Bal | — | 5 | 25 | 0.04 | present | Bal | 10 | 7 | 2 | 20 | 180 | X |

EXAMPLE 3

The method of Example 1 was carried out to produce the bimetal bearings, the copper alloy of which had the composition shown in Table 5.

TABLE 5

| Nos. | Composition (wt %) | | | | | Sub-layer Concentrated Layer (Intensity Ratio with respect to Bulk) | | | Seizure Load (kg/cm$^2$) | Remarks |
|---|---|---|---|---|---|---|---|---|---|---|
|  | Cu | Ag | Sn | P | Others | Ag | Sn | Others |  |  |
| 39 | Bal | 1 | 6 | 0.1 | — | 1.6 | 2.1 | — | 950 | inventive |
| 40 | Bal | 0.8 | 3.5 | 0.05 | Al=1.2 | 1.4 | 1.8 | Al=1.7 | 920 | inventive |
| 41 | Bal | — | 4 | — | In=4 | — | 2.0 | In= | 850 | inventive |
| 42 | Bal | 1.4 | — | 0.12 | Mg=3 | 1.8 | — | Mg=1.4 | 880 | inventive |
| 43 | Bal | 1 | 5 | 0.1 | Sb=6 | 1.5 | 2.0 | Sb=2.2 | 920 | inventive |
| 44 | Bal | — | 3 | 0.01 | Cd=6 | 1.4 | — | Cd=1.8 | 900 | inventive |
| 45 | Bal | 1 | 7 | 0.15 | Sb=4 | 1.6 | 2.8 | Sb=2.0 | 940 | inventive |
| 46 | Bal | — | 4 | 0.08 | In=5 Cd=7 | — | 2.1 | In=2.4 Cd=2.3 | 920 | inventive |
| 47 | Bal | 0.03 | 0.07 | — | — | 3.3 | 1.4 | — | 820 | inventive |
| 48 | Bal | 2 | 6 | 0.1 | — | 2.1 | 4.6 | — | 950 | inventive |
| 49 | Bal | 0.1 | 0.5 | — | In=1.0 | 3.0 | 1.4 | In=1.2 | 860 | inventive |
| 50 | Bal | 4 | — | — | In=6 | 4.1 | — | In=4.4 | 900 | inventive |
| 51 | Bal | 1 | 3 | 0.05 | In=0.1 Sb=0.1 Al=0.05 Cd=0.1 | 2.1 | 1.2 | In=0.4 Sb=0.2 Al=0.1 Cd=0.1 | 870 | inventive |
| 52 | Bal | 4 | 8 | 0.5 | — | 4.8 | 4.7 | — | 820 | inventive |
| 53 | Bal | 1 | — | 0.1 | In=6 | 1.0 | — | — | 420 | comparative |
| 54 | Bal | — | 3 | 0.11 | In=3 | — | 1.0 | In=1.0 | 380 | comparative |
| 55 | Bal | 1.5 | — | 0.08 | Cd=6 | 1.0 | — | Cd=1.0 | 380 | comparative |
| 56 | Bal | 1.3 | — | 0.05 | Mg=4 | 1.0 | — | Mg=1.0 | 420 | comparative |
| 57 | Bal | 6 | — | 0.15 | In=4 Sb=4 | 1.0 | — | In=1.0 Sb=1.0 | 400 | comparative |
| 58 | Bal | 1 | 5 | 0.1 | — | 1.0 | 1.2 | — | 450 | comparative |
| 59 | Bal | — | 10 | — | Pb=10 | — | 8.9 | Pb=9.8 | 400 | comparative |
| 60 | Bal | — | 5 | — | Pb=24 | — | 4.7 | Pb=21.8 | 470 | comparative |

Figure 8:
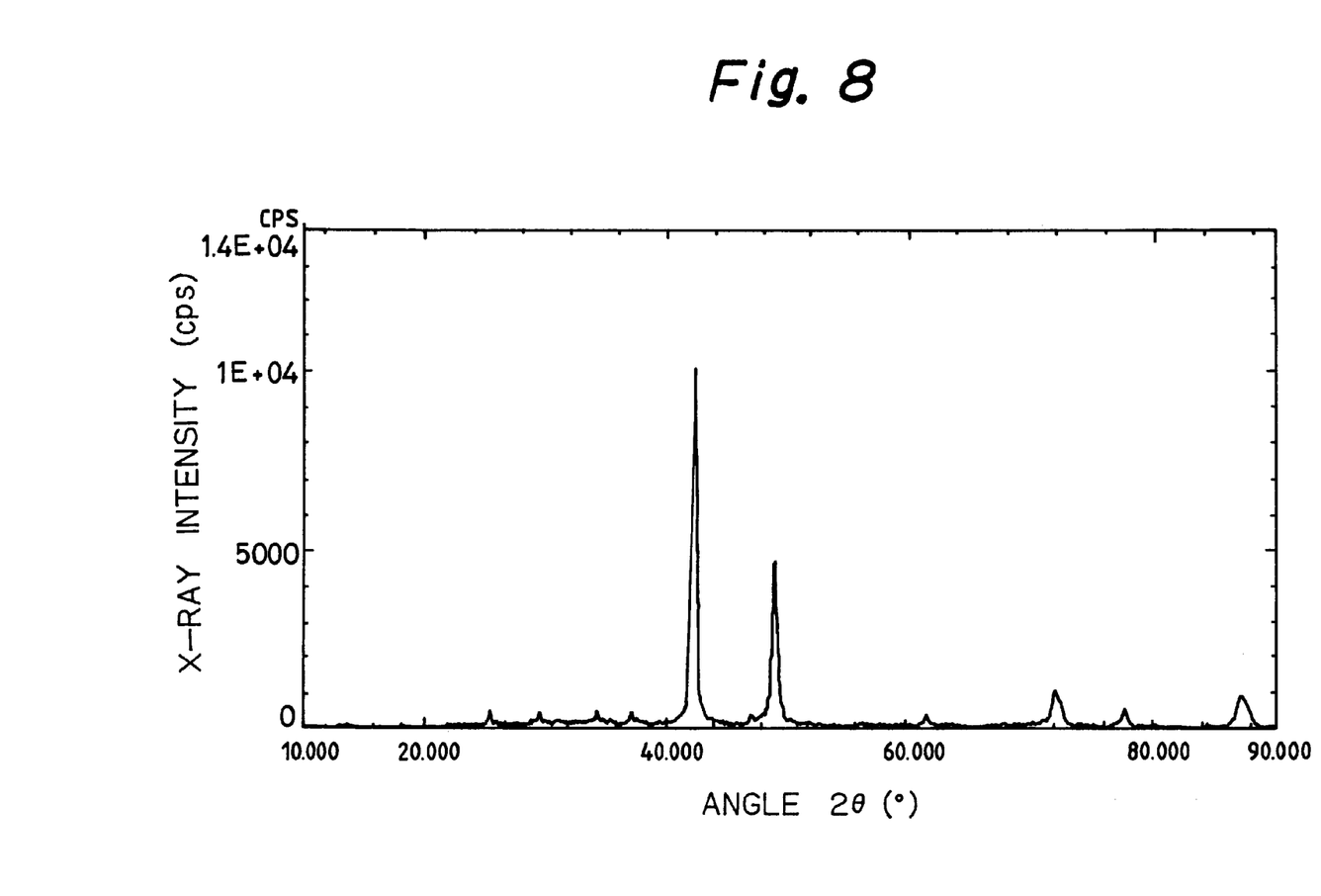
FIG. 8 is an X-ray diffraction chart of Sample No. 5 f Table 5.
Figure 9:
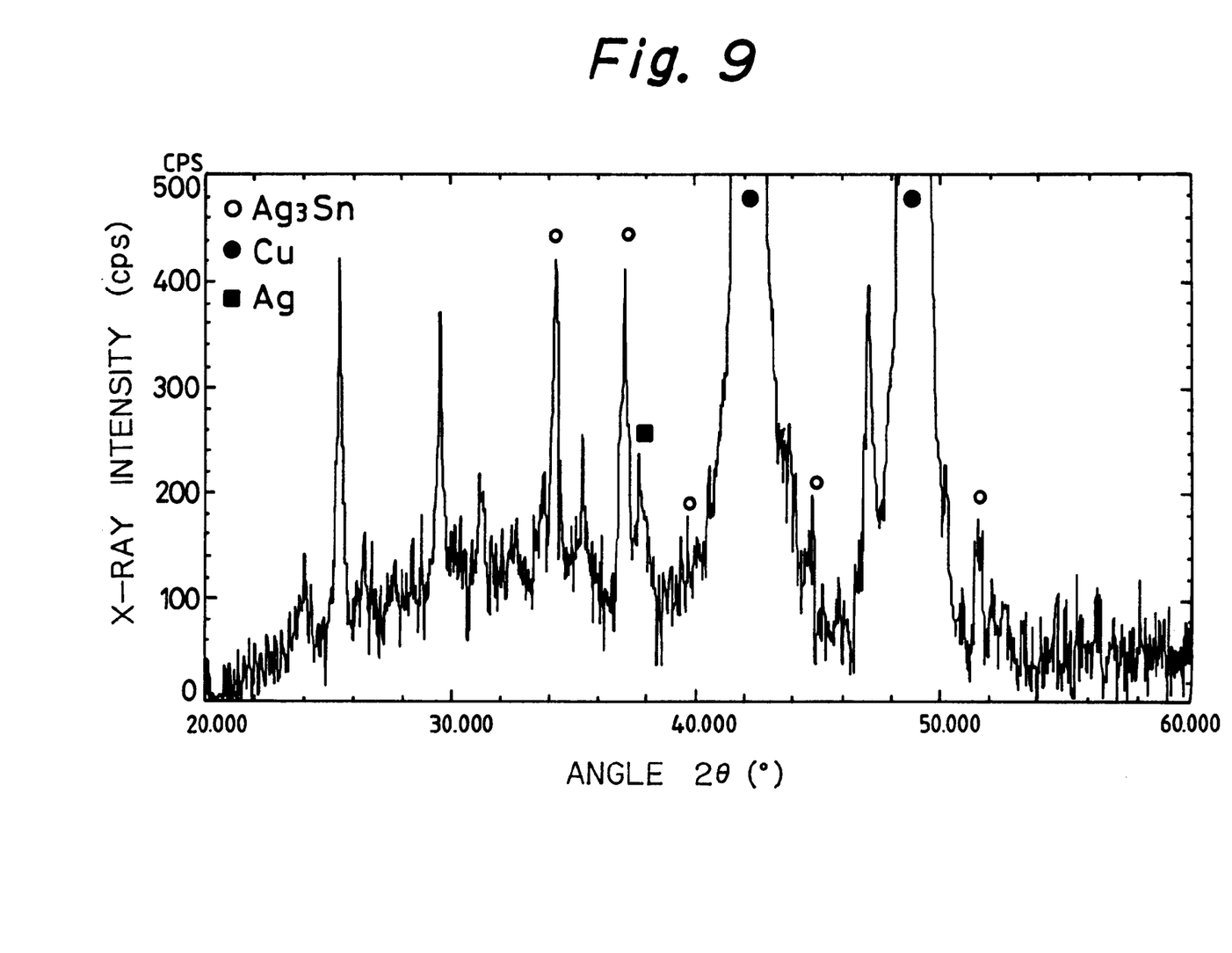
FIG. 9 is a magnified view of FIG. 8.

Sample No. 24 of Table 5 was subjected after sliding for 20 hours to the X-ray diffraction of the surface layer. The result is shown in FIG. 8. Its magnification at the intensity level of 500 cps or less is shown in FIG. 9. However, the noise signals were not exactly but roughly shown.

According to ASTM X-ray diffraction data of hexagonal Ag$_3$Sn (4-0800, MINOR CORRECTION edition), d=2.29 nm, I/I$_1$=100, d=2.39 nm, I/I$_1$=80, d=1.76 nm, I/I$_1$=80, d=2.36 nm, I/I$_1$=60. The measure data well coincide to these standard data. It can therefor be recognized that ε-Ag$_3$Sn is formed in the sub-layer. Peaks for the metallic Cu crystals and Ag crystals are also shown in FIGS. 8 and 9, which are reflections from the regions 3 and 4.

As is described hereinabove, the present invention can fundamentally solve the problems which the conventional sliding bearings encounter. Therefore, it is expected that the conventional KELMET used as the parts of an internal combustion engine and the like is replaced with the inventive bearings.

What is claimed is:

1. A copper alloy with a hexagonal or eutectic structure layer on the surface having improved seizure resistance, the copper alloy consisting of:
   Cu;
   at least one element selected from the group consisting of Ag, Sn, from 1 to 15% by weight of Sb, from 1 to 15% by weight of In, from 0.1 to 5% by weight of Mn, from 0.01 to 10% by weight of Fe, from 1 to 30% by weight of Zn, Ni and from 1 to 5% by weight of Cr;

and unavoidable impurities including Si, O and S;

said copper alloy being subjected to a treatment to keep said at least one element in solid solution under the non-equilibrium state said Si not forming a precipitate, and said S being present as a Cu—S secondary phase, wherein said at least one element reacts with sulfur and oxygen of lubricating oil and forms a hexagonal or eutectic structure layer on the surface of the alloy.

2. A copper alloy according to claim 1, wherein the total amount of said at least one element is 0.1% by weight or more.

3. A copper alloy according to claim 1 or 2, wherein said at least one element is the solute element in said Cu matrix in a non-equilibrium state.

4. A copper alloy according to claim 1 or 2, wherein said at least one element includes at least Ag.

5. A copper alloy according to claim 1 or 2, wherein said at least one element includes at least Ag and Sn.

6. A copper alloy according to 1 or 2, wherein said alloy is a sintered alloy produced by the steps comprising atomizing a copper melt, sintering an atomized powder in a temperature range, in which said at least one element is dissolved in a Cu matrix, and cooling the sintered powder at a cooling rate of 50°/minute or more.

7. A copper alloy according to claim 1 or 2, wherein said alloy is a cast alloy produced by cooling a melt at a cooling speed 100° C./minute or higher.

8. The copper alloy having improved seizure resistance according to claim 1, in which the copper alloy is produced by the casting method or atomizing method.

9. The copper alloy having improved seizure resistance according to claim 1, in which the copper alloy is in the form of a rolled material or a sintered material.

10. A copper alloy with a hexagonal or eutectic structure layer on the surface having improved seizure resistance, the copper alloy consisting of:

Cu;

0.01 to 0.5% by weight of P;

at least one element selected from the group consisting of Ag, Sn, from 1 to 15% by weight of Sb, from 1 to 15% by weight of In, from 0.1 to 5% by weight of Mn, from 0.01 to 10% by weight of Fe, from 1 to 30% by weight of Zn, Ni and from 1 to 5% by weight of Cr;

and unavoidable impurities including Si, O and S;

said copper alloy being subjected to a treatment to keep said at least one element in solid solution under the non-equilibrium state said Si not forming a precipitate, and said S being present as a Cu—S secondary phase, wherein said at least one element reacts with sulfur and oxygen of lubricating oil and forms a hexagonal or eutectic structure layer on the surface of the alloy.

11. A copper alloy with a hexagonal or eutectic structure layer on the surface having improved seizure resistance, the copper alloy consisting of:

Cu;

0.01 to 0.5% by weight of P;

at least one element selected from the group consisting of Ag, Sn, from 1 to 15% by weight of Sb, from 1 to 15% by weight of In, from 0.1 to 5% by weight of Mn, from 0.01 to 10% by weight of Fe, from 1 to 30% by weight of Zn, Ni and from 1 to 5% by weight of Cr;

and unavoidable impurities including Si, 0 and S;

said copper alloy being subjected to a treatment to keep said at least one element in solid solution under the non-equilibrium state said Si not forming a precipitate, and said S being present as a Cu—S secondary phase, wherein said at least one element reacts with sulfur and oxygen of lubricating oil and forms a hexagonal or eutectic structure layer on the surface of the alloy.

12. A copper alloy with a hexagonal or eutectic structure layer on the surface having improved seizure resistance, the copper alloy consisting of:

Cu;

0.01 to 0.5% by weight of P;

at least one element selected from the group consisting of Ag, Sn, from 1 to 15% by weight of Sb, from 1 to 15% by weight of In, from 0.1 to 5% by weight of Mn, from 0.01 to 10% by weight of Fe, from 1 to 30% by weight of Zn, Ni and from 1 to 5% by weight of Cr;

and unavoidable impurities including Si, O and S;

said copper alloy being subjected to a treatment to keep said at least one element in solid solution under the non-equilibrium state said Si not forming a precipitate, and said S being present as a Cu—S secondary phase, wherein said at least one element reacts with sulfur and oxygen of lubricating oil and forms a hexagonal or eutectic structure layer on the surface of the alloy.

13. A copper alloy with a hexagonal or eutectic structure layer on the surface having improved seizure resistance, the copper alloy consisting of:

Cu;

0.01 to 0.5% by weight of P;

at least one element selected from the group consisting of Ag, Sn, from 1 to 15% by weight of Sb, from 1 to 15% by weight of In, from 0.1 to 5% by weight of Mn, from 0.01 to 10% by weight of Fe, from 1 to 30% by weight of Zn, Ni and from 1 to 5% by weight of Cr;

and unavoidable impurities including Si, O and S;

said copper alloy being subjected to a treatment to keep said at least one element in solid solution under the non-equilibrium state said Si not forming a precipitate, and said S being present as a Cu—S secondary phase, wherein said at least one element reacts with sulfur and oxygen of lubricating oil and forms a hexagonal or eutectic structure layer on the surface of the alloy.

14. A copper alloy according to claims 12 or 13, wherein said at least one element includes at least Ag and Sn.

* * * * *